Aug. 19, 1969    J. GALLOWAY    3,462,040
DEVICE FOR REDUCING THE EVAPORATION OF WATER FROM DAMS, TANKS
AND LIKE WATER STORAGE UNITS
Filed Nov. 17, 1966

INVENTOR
JAMES GALLOWAY

BY *Jabthim*

AGENT

United States Patent Office 3,462,040
Patented Aug. 19, 1969

3,462,040
DEVICE FOR REDUCING THE EVAPORATION OF WATER FROM DAMS, TANKS AND LIKE WATER STORAGE UNITS
James Galloway, 20 Ford St., West Midland, Western Australia, Australia
Filed Nov. 17, 1966, Ser. No. 595,049
Claims priority, application Australia, Dec. 1, 1965, 67,347/65; Dec. 9, 1965, 67,728/65; July 4, 1966, 7,820/66
Int. Cl. B65d 87/18
U.S. Cl. 220—26                                    8 Claims

ABSTRACT OF THE DISCLOSURE

Evaporation of water from dams, tanks, etc. is reduced by means of panels adapted to float on the water surface. The panels are preferably hexagonal, are made of an expanded plastic material; they may be weighted by the application of a concrete layer and they may also be provided with a heat reflecting layer. The panel edges may be formed with projecting flanges; also, grooves may be arranged in the panel edges and/or the bottom surfaces.

---

This invention relates to a device for reducing the evaporation of water from dams, tanks and like water storage units.

The object of the present invention is to provide for reducing evaporation from open water storage devices, which are simple to manufacture and which require little or no maintenance.

In its broadest form the invention resides in that a device is provided, comprising a plurality of panels adapted to float on the surface of the water in edge to edge relationship.

Preferably the panels are formed from a material which resists weathering and which does not become waterlogged. Several such materials, and methods of construction using these materials, have been found suitable in carrying out the present invention.

Two materials which are particularly suitable for the purposes of the present invention are expanded polystyrene and polyurethane foam. Panels formed from these two materials may be covered with another material which will protect the panels against scuffing and abrasion.

Suitable covering materials comprise polyester or epoxy resins which may be reinforced with fibrous materials such as glass fibers. Various pigments and anti-oxidants may be incorporated in the covering materials or the panels themselves to increase the resistance to weathering.

It has also been found that satisfactory panels can be formed by making a hollow watertight container out of sheet materials such as flexible plastic sheet material or rigid materials such as glass, concrete, waterproof plywood or rigid plastic sheets.

When hollow panels are formed out of flexible plastic sheet materials such as polyethylene or polyvinyl chloride the panels are inflated so that they are buoyant. The flexible plastic panels are preferably formed in the same manner in which inflatable air mattresses are formed. Two sheets of the material are placed together and welded together around the periphery.

A series of spaced welds are then formed so that a series of pockets are formed, the pockets being in communication with each other. One of the pockets has an air valve incorporated therein, through which air under low pressure can be admitted to inflate the unit.

The panels may be of any shape which will enable them to abut together edge to edge to form a protective cover over the surface of the water. The panels are preferably hexagonal, although they may have any other suitable shape such as rectangular, square, triangular, octagonal or any other polygonal shape.

Preferably the edges of the panels are provided with upwardly and/or downwardly directed flanges which provide a greater bearing surface for the abutting adjacent panels and thereby prevent the panels from overlapping.

To prevent water being lost through capillary action between the edges of adjacent panels a groove may be formed in the edges of the panels to break any capillary action. Alternatively the edges may be rounded to provide only small area of contact and thus reduce the capillary action.

To place the panels in position the operator stands on the side of the tank or dam facing in the direction in which the wind is blowing. He places the panels one at a time on the surface of the water. The panels are carried across the surface of the water by the wind, until they reach the opposite bank, whereby all the panels have been placed in position to form a continuous cover over the entire surface of the water.

As the water in the tank or dam is used the surface area decreases so that the outer panels are left lying on the banks as the water recedes. They may be left there until the water is replenished or they may be collected and stored.

To ensure that the panels left lying on the bank will float clear when the water runs in to fill the tank or dam the bottom surfaces of the panels are preferably provided with one or more grooves so that the water can get in under the panel to float it off the bank.

It has been also found that it is desirable that the panels should be weighted or the buoyancy reduced, so that they float low in the water, thereby reducing the possibility of the arrangement of the panels being disturbed by the wind. Panels formed from expanded polystyrene or polyurethane foam may be weighted by encasing then in or applying a layer of concrete (cement and sand or other fine aggregate) to the exposed surface thereof. This ensures that the panels float lower in the water and also protects the panels against damage. Plaster of Paris, bitumen and other like materials may be used in place of concrete.

However the weighting of polystyrene or polyurethane foam panels is not essential since after these panels have been in contact with the water for some time they will absorb sufficient water to float much lower, and thus reduce any action the wind may have in blowing the panels around.

In extremely windy areas, strands of wire and/or wire netting are suspendend above the surface of the water to hold the panels in position.

It has also been found that it is preferable to provide the exposed surfaces of the panels with a heat reflecting surface so as to reduce the heat absorption of the panels and thus help reduce evaporation. This may be accomplished by wrapping a metal foil around the panel, or by attaching a sheet of reflective material such as metal foil or thin-gage metal to the exposed surfaces of the panels. Alternatively the panels or at least the exposed surfaces thereof may be painted with a heat reflecting paint.

Other objects and many of the attendant advantages of the invention will be readily appreciated as the same becomes better understood by reference to the following description, when considered with the accompanying drawing, wherein FIG. 1 is a somewhat schematic illustration of a tank with the inventive panels floating on the water in the tank;

Figure 1:
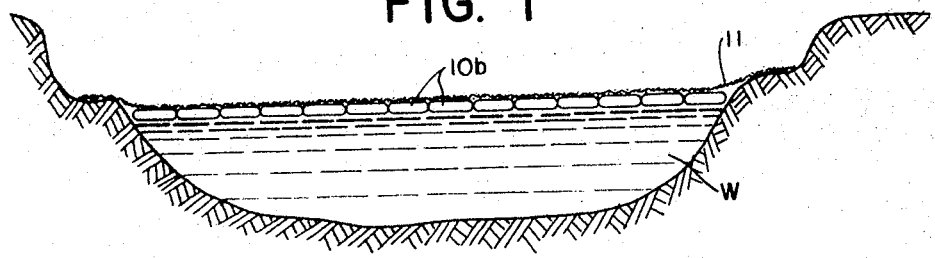

For purposes of general illustration, FIG. 1 shows a tank, dam or the like having water W therein on which float a number of panels 10b, to be described in more detail with reference to FIG. 3. Other embodiments of the inventive panels, identified by numerals 10a and 10c, are shown in respective FIGS. 2 and 4.

In FIG. 1 retaining and positioning means are also shown for the panels, in the form of a wire netting 11 suspended above the surface of the water W. The netting or its equivalent is adapted to prevent wind and other extraneous effects to displace the panels.

Figure 2:
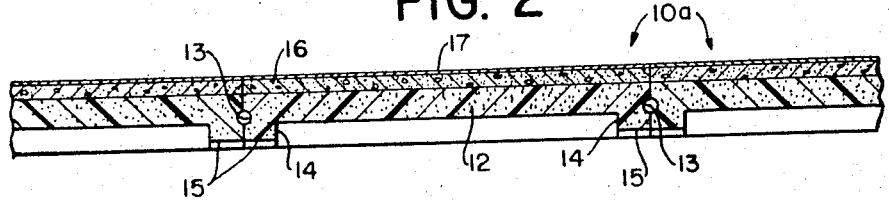
FIG. 2 shows a first exemplary embodiment of the inventive panels for reducing water evaporation, in a vertical sectional view.

FIG. 2 shows a first embodiment of the inventive panels, identified by numeral 10a, including a body 12 made of an expanded plastic material. Grooves 13 may be provided in downwardly extending flanges 14, to reduce capillary action, while other grooves or recesses 15 allow the water to get under the panels to float them off the bank of the tank or the like.

A layer 16 of concrete or similar material is applied to at least one surface of the panels so as to increase their weight. The layer 16 may completely encase the panels (not shown); it may also consist of plaster of Paris, bitumen or other suitable material.

In FIG. 2, a layer 17 of heat reflecting material is also shown, applied to the upper exposed surfaces of the panels, so as to reduce heat absorption and thus assist in reducing the evaporation. Thin-gage metal or metal foil may be used for this purpose; a suitable paint layer can also be employed.

Figure 3:
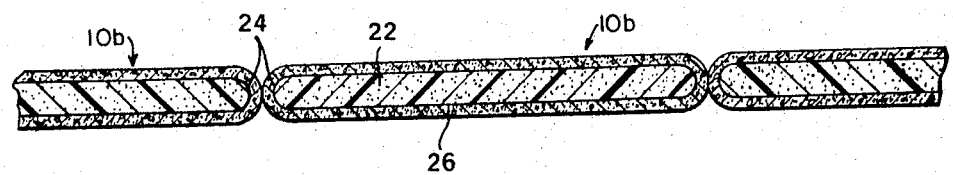
FIG. 3 is a similar vertical sectional view of a second exemplary embodiment of the panels.

FIG. 3 shows a second exemplary embodiment of the inventive panels, identified by numeral 10b, and including a body portion 22 made of a material similar to that of body 12 of the first embodiment 10a. The panels 10b have rounded edges 24 to reduce capillary action. A concrete or similar layer 26, similar to layer 16 of the first embodiment, surrounds the panels 10b, also providing protection for the body 22 against scuffing.

Figure 4:
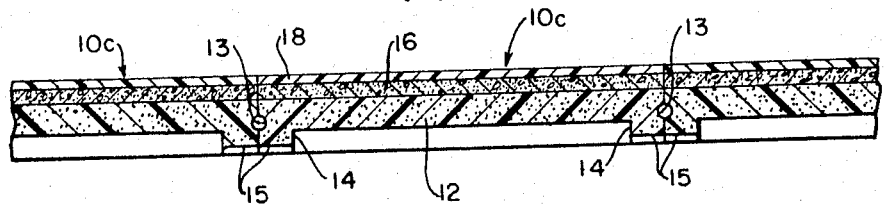
FIG. 4 is a modification of the first embodiment, also in a vertical sectional view.

Finally, FIG. 4 shows a third embodiment, actually a modification of the first, identified by 10c and having a reinforcing cover layer 18 thereon, in lieu of the concrete layer 16 of FIG. 2, for protecting the panels against scuffing and abrasion. Suitable covering materials comprise polyester or epoxy resins which may be reinforced with fibrous materials such as glass fibers. Pigments and/or anti-oxidants may be incorporated in the layer 18 (or the panels themselves) to increase the resistance to weathering. In other respects the structure shown in FIG. 4 is similar to that of FIG. 2.

The effectiveness of the present invention is illustrated by the following tests carried out in Perth, Western Australia, Australia, during the months of January and February 1966.

Two tanks, to be identified hereunder by the letters A and B, each four feet square and six inches deep, were placed adjacent each other in an open position. Both tanks were filled to a depth of 4½″ with water. The surface of the water tank A was covered using sixteen panels according to the present invention, each panel being composed of polystyrene foam, measured one foot square by one inch deep. Tank B was left uncovered.

Measurements of the depth of water in both tanks were taken at 5:30 p.m. each day until the water in tank B had evaporated. The tests were carried out twice over the period Jan. 11, 1966 to the Feb. 3, 1966. The results of the tests are set out in the tables below:

TEST 1

| Day | Depth (in.) | | Temperature (deg.) | |
|---|---|---|---|---|
| | Tank A | Tank B | Maximum | Minimum |
| 11th Jan | 4½ | 4½ | 76.0 | 62.1 |
| 12th Jan | 4½ | 3⅞ | 77.4 | 59.3 |
| 13th Jan | 4½ | 3½ | 85.4 | 59.9 |
| 14th Jan | 4½ | 3¼ | 73.5 | 62.8 |
| 15th Jan | 4½ | 3 | 80.0 | 55.9 |
| 16th Jan | 4½ | 2⅝ | 83.3 | 57.2 |
| 17th Jan | 4½ | 2¼ | 84.0 | 59.0 |
| 18th Jan | 4 15/32 | 1¾ | 90.0 | 63.0 |
| 19th Jan | 4 7/16 | 1¼ | 94.6 | 69.6 |
| 20th Jan | 4 13/32 | ¾ | 99.2 | 75.1 |
| 21st Jan | 4 13/32 | ½ | 103.0 | 77.6 |
| 22nd Jan | 4⅜ | ⅛ | 79.6 | 69.0 |
| 23rd Jan | 4⅜ | Nil | 76.0 | 67.8 |

From this test it is seen that in the same time as 100% of the water was lost from the uncovered tank B, only 2.8% of water was lost from the tank A covered according to the invention.

TEST 2

| Day | Depth (in.) | | Temperature (deg.) | |
|---|---|---|---|---|
| | Tank A | Tank B | Maximum | Minimum |
| 23rd Jan | 4 9/16 | 4¼ | 76.0 | 67.8 |
| 24th Jan | 4 9/32 | 3⅞ | 76.9 | 66.9 |
| 25th Jan | 4¼ | 3 9/16 | 77.4 | 62.4 |
| 26th Jan | 4¼ | 3 5/16 | 76.0 | 60.1 |
| 27th Jan | 4 7/32 | 3 | 76.2 | 61.0 |
| 28th Jan | 4 7/32 | 2⅝ | 77.9 | 60.0 |
| 29th Jan | 4 7/32 | 2¼ | 87.7 | 64.9 |
| 30th Jan | 4 7/32 | 1¾ | 93.1 | 63.1 |
| 31st Jan | 4 9/16 | 1¼ | 95.8 | 67.5 |
| 1st Feb | 4 9/32 | 1 | 97.8 | 72.9 |
| 2nd Feb | 4⅛ | ⅜ | 95.5 | 71.3 |
| 3rd Feb | 4 1/16 | Nil | 88.0 | 67.8 |

In this test 9.7% of water was lost from the covered tank A in the same time as 100% of the water was lost from the uncovered tank B.

These two tests clearly illustrate the effectiveness of the panels according to the present invention.

It has been found that the use of the panels according to the invention minimizes any wave action on dams and the like caused by the wind. It has also been found that the panels also inhibit the growth of algae and other similar growths since they are effective in reducing the light reaching the dam sides.

It should be understood, of course, that the foregoing disclosure relates only to preferred embodiments of the invention and that it is intended to cover all changes and modifications of the examples described which do not constitute departures from the spirit and scope of the invention.

I claim:

1. A device for reducing the evaporation of water from dams, tanks and like water storage units, comprising, in combination, a plurality of panels adapted to float on the water surface in edge-to-edge relationship, so as to form a substantially continuous cover over the entire water surface, each of said panels being formed from an expanded plastic material which resists weathering and which does not become waterlogged, and a layer of concrete applied to at least one surface of said plastic material so as to increase the weight of said panels.

2. The device as defined in claim 1, further comprising a heat reflecting surface applied to at least one exposed surface of said panels.

3. The device as defined in claim 1, wherein said panels have rounded edges to reduce capillary action.

4. The device as defined in claim 1, wherein at least one groove is formed in the bottom surface of said panels to allow the water to get in under said panels to float the same off the bank of the tank or the like water storage unit after the water surface has dropped and said panels were left lying on the bank.

5. The device as defined in claim 1, further comprising a reinforcing cover material for protecting said panels against scuffing and abrasion.

6. The device as defined in claim 5, further comprising an anti-oxidant substance added to said cover material to increase the weathering resistance.

7. The device as defined in claim 1, further comprising retaining and positioning means associated with the tank or the like water storage unit, disposed somewhat above the water surface, to prevent wind and other extraneous effects to displace said panels.

8. The device as defined in claim 7, wherein said retaining and positioning means is in the form of a wire netting suspended above the water surface.

References Cited

UNITED STATES PATENTS

| | | | |
|---|---|---|---|
| 1,269,746 | 6/1918 | Robeson. | |
| 1,639,625 | 8/1927 | Afonin | 220—26 |
| 1,674,039 | 6/1928 | Glass | 220—26 |
| 1,712,321 | 5/1929 | Afonin | 220—26 |
| 1,734,623 | 11/1929 | Griffin | 220—26 |
| 1,900,319 | 3/1933 | Vermeulen. | |
| 2,281,748 | 5/1942 | Carney | 220—26 |
| 2,867,346 | 1/1959 | Champagnat | 220—26 |
| 2,919,047 | 12/1959 | Fino | 220—26 |
| 2,974,822 | 3/1961 | Trimble | 220—26 |
| 3,104,775 | 9/1963 | Champagnat | 220—26 |

FOREIGN PATENTS

| | | |
|---|---|---|
| 840,214 | 1/1939 | France. |
| 833,325 | 3/1952 | Germany. |
| 269,706 | 4/1927 | Great Britain. |
| 291,618 | 6/1928 | Great Britain. |

JOSEPH R. LECLAIR, Primary Examiner

JAMES R. GARRETT, Assistant Examiner